US010051066B1

(12) United States Patent
Mirisola (10) Patent No.: US 10,051,066 B1
(45) Date of Patent: Aug. 14, 2018

(54) SHARING PANELIST INFORMATION WITHOUT PROVIDING COOKIES

(71) Applicant: Google Inc., Mountain View, CA (US)

(72) Inventor: Raimundo Mirisola, Zug (CH)

(73) Assignee: Google LLC, Mountain View, CA (US)

(\*) Notice: Subject to any disclaimer, the term of this patent is extended or adjusted under 35 U.S.C. 154(b) by 336 days.

(21) Appl. No.: 14/073,498

(22) Filed: Nov. 6, 2013

(51) Int. Cl.
*H04L 29/08* (2006.01)

(52) U.S. Cl.
CPC .......... *H04L 67/22* (2013.01); *H04L 67/1002* (2013.01); *H04L 67/08* (2013.01)

(58) Field of Classification Search
CPC ......... H04L 43/04; H04L 43/08; H04L 43/10; H04L 43/0876; H04L 67/02; H04L 67/10; H04L 67/22; H04L 41/069; H04W 28/08; H04W 36/02; H04W 40/30; H04W 4/023; H04W 4/028; H04W 4/046; H04W 4/06; H04W 4/08; H04W 60/00; H04W 64/00; H04W 76/02; H04W 76/023; H04W 88/04; H04W 88/06; H04W 4/02; H04W 4/001; H04W 4/008; H04W 4/00; H04W 4/003; H04W 4/18; H04W 84/18; H04W 8/005; H04W 12/06; H04W 12/12; H04W 28/0215; H04W 28/0236
USPC ....... 709/217, 223–245, 202; 225/25, 42, 46
See application file for complete search history.

(56) References Cited

U.S. PATENT DOCUMENTS

| | | | | |
|---|---|---|---|---|
| 8,468,271 B1 \* | 6/2013 | Panwar | .............. | G06Q 30/0615 370/469 |
| 8,549,103 B2 | 10/2013 | Bhatia | | |
| 8,843,626 B2 \* | 9/2014 | Mazumdar | .............. | H04L 43/04 709/224 |
| 2002/0091991 A1 \* | 7/2002 | Castro | ....................... | G06F 9/06 717/106 |
| 2002/0099832 A1 \* | 7/2002 | Yaegerman | ......... | H04L 63/0281 709/228 |
| 2003/0040921 A1 \* | 2/2003 | Hughes | ................... | G06Q 30/02 705/14.66 |
| 2006/0075122 A1 \* | 4/2006 | Lindskog | ............ | G06F 21/6263 709/228 |
| 2006/0265495 A1 \* | 11/2006 | Butler | ............... | G06F 17/30899 709/224 |
| 2007/0136477 A1 \* | 6/2007 | Bryce | ..................... | H04L 67/02 709/227 |

(Continued)

OTHER PUBLICATIONS

Kok, Frans et al, "Internet Audience Measurement Now—Sites, Content and Campaigns—Anywhere. Anyhow," Print and Digital Research Forum 2011—Session 7, pp. 1-11. www.iabeurope.eu/files/5813/6853/2237/2011_print_and_digital_research_forum_appel-koks.pdf.

*Primary Examiner* — David Lazaro
*Assistant Examiner* — Berhanu Shitayewoldetsadi
(74) *Attorney, Agent, or Firm* — Foley & Lardner LLP (57) ABSTRACT

A system and method for sharing panelist information without providing cookie information are provided. The system includes a panel information receiver to receive information from a panel, the information being defined by each of the panelist's access to cookie information sourced from an online shared content network; a log correlation module to create a log based on a correlation of the information and accesses to the cookies via the online shared content network; a log transmitter to transmit the log to the panel; and a panelist data receiver to receive data from panel, the data being defined as content accesses by each of the panelists.

20 Claims, 4 Drawing Sheets

(56) References Cited

U.S. PATENT DOCUMENTS

| | | | |
|---|---|---|---|
| 2007/0150603 A1* | 6/2007 | Crull | G06F 17/3089 709/227 |
| 2008/0091767 A1* | 4/2008 | Afergan | H04L 67/34 709/202 |
| 2009/0193129 A1* | 7/2009 | Agarwal | H04L 63/0281 709/229 |
| 2010/0145960 A1* | 6/2010 | Casteel | G06F 17/30902 707/756 |
| 2010/0150139 A1* | 6/2010 | Lawson | H04L 12/66 370/352 |
| 2012/0072469 A1 | 3/2012 | Perez et al. | |
| 2012/0084287 A1* | 4/2012 | Lakshminarayan | G06F 17/30536 707/737 |
| 2012/0110027 A1 | 5/2012 | Falcon | |
| 2012/0158954 A1* | 6/2012 | Heffernan | H04L 43/04 709/224 |
| 2012/0215621 A1* | 8/2012 | Heffernan | H04L 43/04 705/14.41 |
| 2012/0239809 A1* | 9/2012 | Mazumdar | H04L 43/04 709/224 |
| 2013/0124685 A1* | 5/2013 | Keitel | H04L 63/0272 709/218 |
| 2013/0145022 A1 | 6/2013 | Srivastava et al. | |
| 2013/0160098 A1* | 6/2013 | Carlson | G06F 21/45 726/6 |
| 2013/0232198 A1 | 9/2013 | Tenbrock | |
| 2013/0291123 A1* | 10/2013 | Rajkumar | G06F 21/00 726/28 |
| 2013/0325583 A1* | 12/2013 | Arini | G06Q 30/0242 705/14.41 |
| 2014/0101736 A1* | 4/2014 | Mays | H04L 63/0421 726/6 |
| 2014/0122690 A1* | 5/2014 | Rowe | G06F 17/30867 709/224 |
| 2014/0122715 A1* | 5/2014 | Rowe | H04L 67/22 709/225 |

* cited by examiner

SHARING PANELIST INFORMATION WITHOUT PROVIDING COOKIES

BACKGROUND

Panels collect data from specific visitors ("panelists") who consume content. The visitor may consume the content through various broadcasting format, such as television, radio, Internet programming, for example. Thus, if a visitor opts-in to a program to have their content consumption monitored (for example, the visitor's web browsing), the panel may ascertain a record of the content the specific visitor has accessed. In this way, the panels may analyze a representative subset of visitors' accesses to content.

Due to agreements with third-parties, the panel may not share specific information (such as cookies) to various third-parties.

SUMMARY

A system and method for sharing panelist information without providing cookie information are provided. The system includes a panel information receiver to receive information from a panel about panelists, the information being defined by each of the panelist's access to cookie information sourced from an online shared content network; a log correlation module to create a log based on a correlation of the information and accesses to the cookies via the online shared content network; a log transmitter to transmit the log to the panel; and a panelist data receiver to receive data from the panel, the data being defined as content accesses by each of the panelists.

DESCRIPTION OF THE DRAWINGS

The detailed description refers to the following drawings, in which like numerals refer to like items, and in which.

DETAILED DESCRIPTION

An online shared content network distributes shared content to various online content providers. The online shared content network may maintain a cookie associated with various visitors to online content providers. The cookie may allow the online shared content network to determine which shared content to serve and distribute to the visitor associated with the cookie.

The shared content may be directed towards a good, service, or activity. The shared content may be related to the online content. For example, if the visitor accesses online content pertaining to a vehicle, the shared content may be directed to a specific brand of vehicle, and in response to the visitor clicking through the shared content, the visitor may be redirected to additional information about the specific brand of vehicle.

The serving of shared content may be monetized. In response to shared content being clicked-through, the online shared content network may bill the source of the shared content accordingly. Thus, an online shared content network may be incentivized to serve relevant shared content, or shared content associated with the visitor's previous activities or perceived interests.

A panel may be employed to observe and collect data associated with a selected group of visitors ("panelists"). The panelists may opt-in to being observed via the panel. Thus, the panel may record accesses from the panelist's browser or mobile application to various online content providers.

The panel may employ various techniques to collect data. The panel may provide each of the specific visitors an embedded application to install on a web browser or mobile application employed to access various online sites. Alternatively, the panel may be incorporated in a router. The router may be employed by various visitors to access various online sites. In this way, the panel is cognizant of the universal resource locations (URL) accessed by each visitor.

In the process of recording accesses, the panel may maintain a record of the cookies that the panelist receives. For instance, when the panelist's browser or mobile application generates a request for content from an online content provider, the panel may record the URL associated with the request. A HTTP request to retrieve information from the URL may contain a unique identification associated with the cookie ("cookie id"). Accordingly, the server may use the cookie id to retrieve shared content from an online shared content network.

The panel may provide information about the online content associated with an individual panelist. However, as prohibited by agreements between the panel and various third-parties, the panel may be prohibited from distributing information associated with individual cookies to the third-parties. Thus, the information sourced from the panel may be incomplete.

The implementers of the online shared content network may benefit from knowing contextual information associated with each panelist that generates the cookies detected by the panel. In addition to not knowing contextual information, certain other client to server and server to client information may be not recorded as well. This may be due to panels not capturing certain secured data, the panel software failing, and other causes.

Further, as mentioned above, various agreements between panels and third-parties may prevent panels from sharing information about individual panelists and associated cookies for the panelist. Thus, the online shared content network may not be able to fully ascertain contextual server information for a specific panelist. The contextual information may be associated with the content the panelist accessed, or the panelist's interaction with a server, for example. The contextual information may be employed to request a specific shared content item, or shared content directed to a specific theme. In certain situations, the online shared content network may not be cognizant at the time the request for shared content is made of the contextual information used to request a specific shared content item or shared content theme.

Disclosed herein are methods and systems for sharing panelist information without providing cookies. By employing the aspects disclosed herein an online shared content network may become cognizant of various interactions with a panelist associated with the panelist's receiving of cookies. However, since the aspects disclosed herein ensure that a panel does not share information about detected accesses to cookies, the online shared content network is able to ascertain the contextual information associated with a panelist's activity without receiving an actual cookie. In this way, the online shared content network is capable of being cognizant of the activity that leads to shared content being distributed without violating a jurisdiction's mandate to not share cookie information associated with an individual panelist.

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Figure 1:
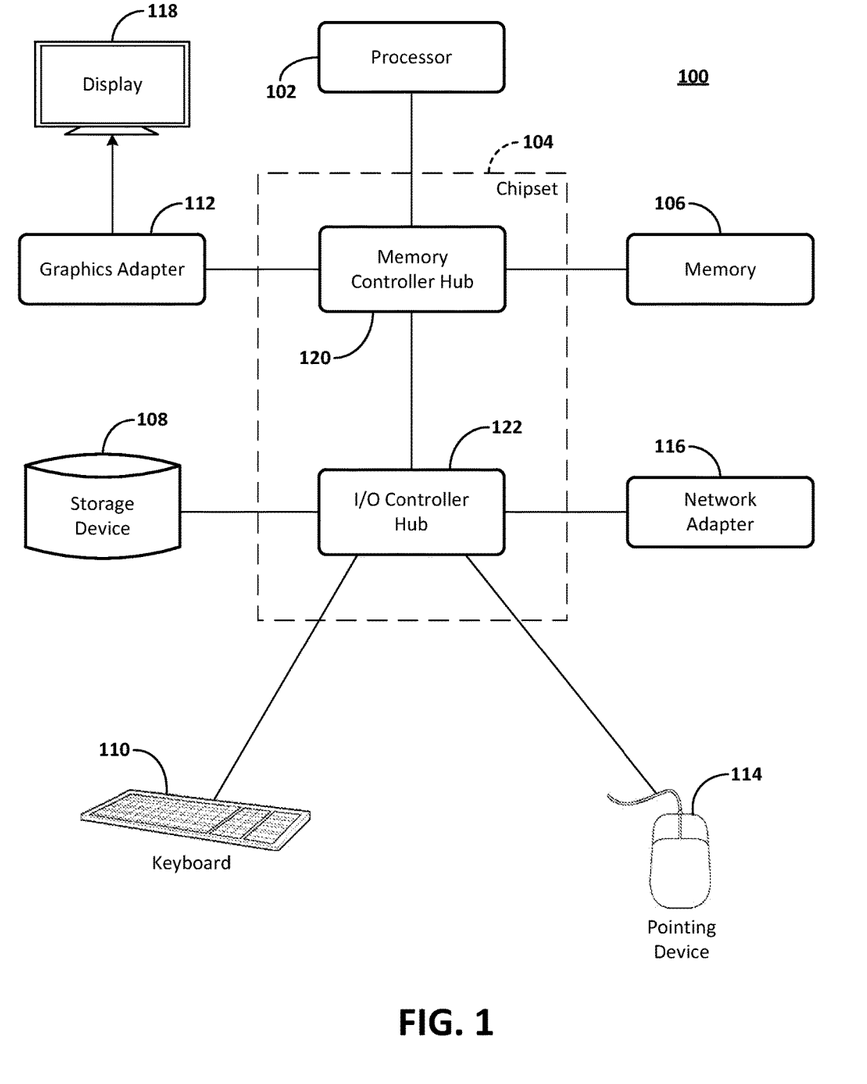
FIG. 1 is a block diagram illustrating an example computer.

FIG. 1 is a block diagram illustrating an example computer 100. The computer 100 includes at least one processor 102 coupled to a chipset 104. The chipset 104 includes a memory controller hub 120 and an input/output (I/O) controller hub 122. A memory 106 and a graphics adapter 112 are coupled to the memory controller hub 120, and a display 118 is coupled to the graphics adapter 112. A storage device 108, keyboard 110, pointing device 114, and network adapter 116 are coupled to the I/O controller hub 122. Other embodiments of the computer 100 may have different architectures.

The storage device 108 is a non-transitory computer-readable storage medium such as a hard drive, compact disk read-only memory (CD-ROM), DVD, or a solid-state memory device. The memory 106 holds instructions and data used by the processor 102. The pointing device 114 is a mouse, track ball, or other type of pointing device, and is used in combination with the keyboard 110 to input data into the computer 100. The pointing device 114 may also be a gaming system controller, or any type of device used to control the gaming system. For example, the pointing device 114 may be connected to a video or image capturing device that employs biometric scanning to detect a specific user. The specific user may employ motion or gestures to command the point device 114 to control various aspects of the computer 100.

The graphics adapter 112 displays images and other information on the display 118. The network adapter 116 couples the computer system 100 to one or more computer networks.

The computer 100 is adapted to execute computer program modules for providing functionality described herein. As used herein, the term "module" refers to computer program logic used to provide the specified functionality. Thus, a module can be implemented in hardware, firmware, and/or software. In one embodiment, program modules are stored on the storage device 108, loaded into the memory 106, and executed by the processor 102.

The types of computers used by the entities and processes disclosed herein can vary depending upon the embodiment and the processing power required by the entity. The computer 100 may be a mobile device, tablet, smartphone or any sort of computing element with the above-listed elements. For example, a data storage device, such as a hard disk, solid state memory or storage device, might be stored in a distributed database system comprising multiple blade servers working together to provide the functionality described herein. The computers can lack some of the components described above, such as keyboards 110, graphics adapters 112, and displays 118.

The computer 100 may act as a server (not shown) for the content sharing service disclosed herein. The computer 100 may be clustered with other computer 100 devices to create the server. The various computer 100 devices that constitute the server may communicate with each other over a network 250.

Figure 2:
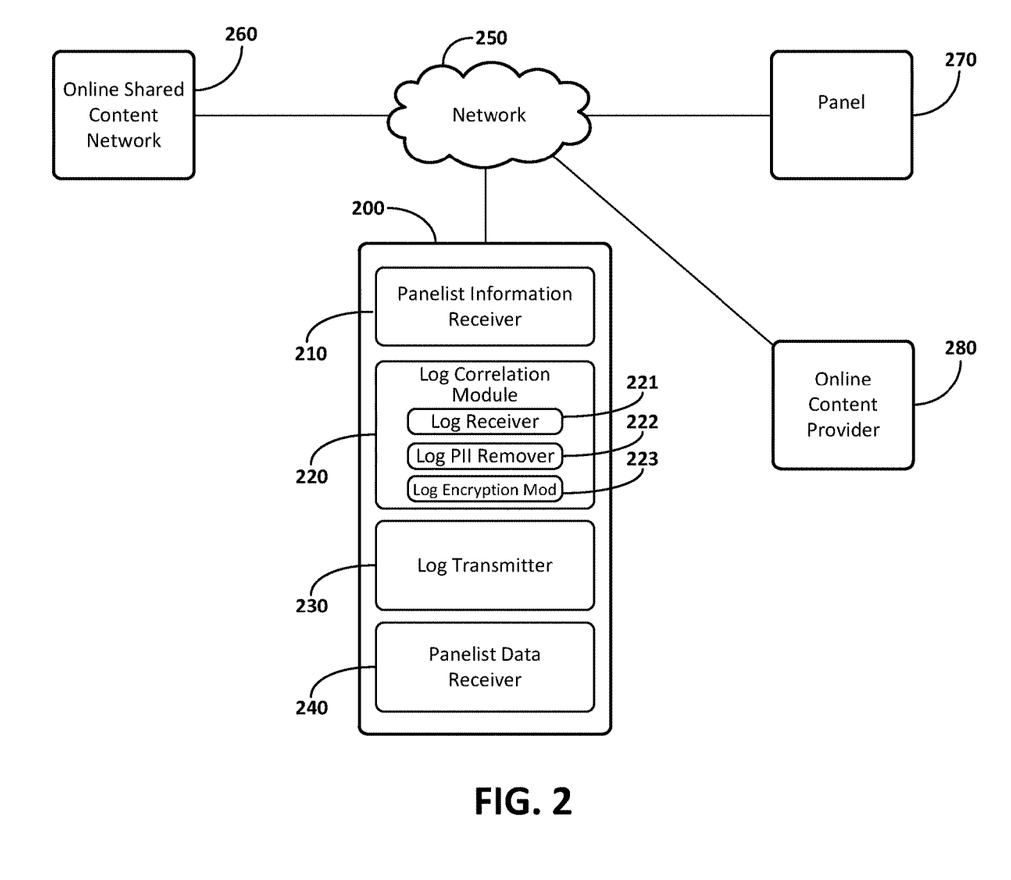
FIG. 2 illustrates an example of a system for sharing panelist information without providing cookies.

FIG. 2 illustrates an example of a system 200 for sharing panelist information with providing cookies. The system 200 includes a panelist information receiver 210, a log correlation module 220, a log transmitter 230, and a panelist data receiver 240.

The system 200 may communicate with an online shared content network 260 and a panel 270 via a network 250. In another implementation, the system 200 may be incorporated in the online shared content network 260, the panel 270, or both. The online shared content network 260 may serve shared content to a visitor to an online content provider 280. The online shared content network 260 may partner with third-parties, such as the online content provider 280, and serve shared content from a third-party associated with the third-party's goods or services. An entity associated with a good, service, or activity may purchase the right to serve shared content, and if a visitor clicks through the shared content, the entity may pay a greater amount in response to the click-through.

The online shared content network 260 may receive a cookie id associated with the visitor, and accordingly, serve shared content based on information associated with the cookie id. The cookie id may be embedded in a URL, or alternatively, contained in a data file stored in a visitor's device, browser, or application. Additionally, or alternatively, the online shared content network 260 may receive a request for a specific shared content item based on the interactions the visitor has with the online content provider 280. For example, if the online content provider 280 presents content related to automobiles, the online shared content network 260 may serve shared content related to a specific automobile.

A visitor may be registered with the panel 270, and referred to as a panelist. The panel 270 monitors various accesses made by the visitor to online content, such as online content served by the online content provider 280. For example, if the visitor enters a URL associated with the online content provider 280, panel 270 may record this access in association with the visitor. The panel 270 may also store information associated with the various aspects of the visitor, such as the visitor's geography, age, and other preferences. The panel 270 may aggregate the data associated with all the visitors and provide data associated with visitors who fit a certain aspect. For example, the panel 270 may determine that online content provider 280 is popular amongst visitors who are of a certain age and live in a certain geographical location.

The panel 270 may also record information associated with various cookies that the panelist shares with various services. For example, the panel 270 may detect that the visitor shared a cookie data file with an online content provider 280 or the online shared content network 260. Alternatively, the panel 270 may detect that cookie information embedded in a URL is transmitted to a third-party, such as the online content provider 280 or the online shared content network 260.

The panel information receiver 210 receives information from the panel 270. The received information may be a log of all the cookies associated with the panel 270 over a specific time period. The information is not transmitted with any PII, and thus, the system 200 may not be cognizant of which panelists are associated with each cookie or cookie id.

In order to preserve the anonymity of the information, the information may undergo a bloom filtering process by adding a predetermined amount of false positive information, or any other process for encoding the information. Thus, by employing one of these processes, the panel serve 270 ensures that it is harder to determine which panelist is associated with the individual cookie information.

The log correlation module 220 includes a log receiver 221, and may also include a log PII remover 222 and a log encryption module 223. The log PII remover 222 and the log encryption module 223 may be selectively incorporated based on a configuration of system 200 selected.

The log receiver 221 receives all of the logs maintained by the online shared content network 260 associated with the information of cookies received by the panel information receiver 210. The information may be a record of a specific visitor's access history to the various cookies.

The log PII remover 222 removes all the PII contained in the logs maintained by the online shared content network 260 and transmitted to the panel 270. The log encryption module 223 encrypts the logs, thereby frustrating a third-party that intercepts or receives the logs to ascertain PII associated with the logs.

Further, the log encryption module 223 may be configured to encrypt the logs so that a recipient, such as the panel 270, may only be privy to cookies in which the panel 270 is associated with. Thus, in order for the panel 270 to review an access to a cookie, the panel 270 may have to maintain a record associated with the access to the cookie as well.

The log transmitter 230 transmits the logs received and processed by the log correlation module 220. The log transmitter 230 may transmit the logs as well as a request to the panel 270. The request may be for information associated with the panelists who match the cookie access information associated with the logs.

In response to receiving the logs and the request, the panel 270 may be configured to provide information associated with each of the panelists associated with the actual cookies (as gleaned by the logs from the online shared content network 260), strip the cookie information (such as references to a cookie id), and attach data associated with each of the associated panelist's browsing activity. Thus, the information provided from the panel 270 may include a table associated with each panelist, and the panelist's observed activities. The information excludes any reference to actual cookies or cookie ids associated with the specific panelist.

The panelist data receiver 240 receives the information produced by the panel 270, indicating the specific browsing activities associated with each panelist, and contextual server information associated with each panelist. Thus, with the information received by the panelist data receiver 240, the system 200 becomes cognizant of the activities associated with each panelist that ultimately leads to the panelist being served shared content.

Figure 3:
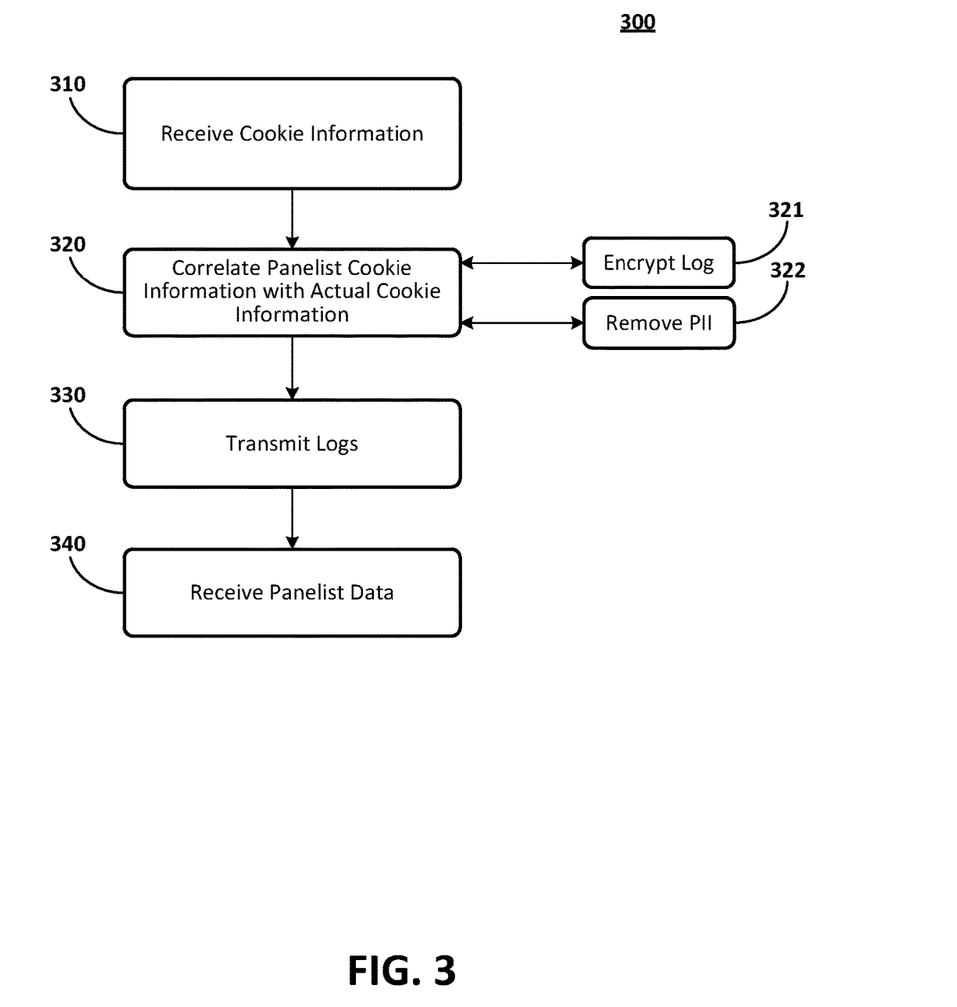
FIG. 3 illustrates an example of a method for sharing panelist information without providing cookies.

FIG. 3 illustrates an example of a method 300 for sharing panelist information without providing cookies. The method 300 may be implemented on a device, such as system 200.

In operation 310, a record of all cookies or cookie information associated with accesses observed for a predetermined time by a panel 270 is received. As discussed above, the panel 270 may observe cookie data files being transferred, or a cookie id embedded in a URL. In order to preserve the anonymity of the data, the record may undergo a process, such as a bloom-filter.

In operation 320, the record received in operation 310 is correlated with logs of actual cookie accesses stored on an online shared content network 260. Thus, the actual accesses to the cookies or a cookie ID that match those observed by the panel 270 are extracted. Method 300 may selectively include an operation to scrub any PII associated with the logs 321 and a log encryption 322.

In operation 330, the logs produced in operation 320 are transmitted to a panel 270. In operation 340, a request is transmitted to the panel 270, requesting the panel 270 to provide information associated with each panelist.

In operation 340, after the panel 270 receives the request and the log of actual accesses to the cookies matching the records sourced in operation 310, a table correlating each panelist with the panelist's browsing activities is received. The panel 270 may ensure that no cookies or cookie id information is transmitted in the table.

Employing method 300, an online shared content network 260 may ascertain information associated with a panelist's activity, while not receiving any indication associated with the panelist's interaction with cookies or a cookie id. Thus, the online shared content network 260 may be cognizant of the browsing activities associated with each panelist that generates specific shared content.

Figure 4:
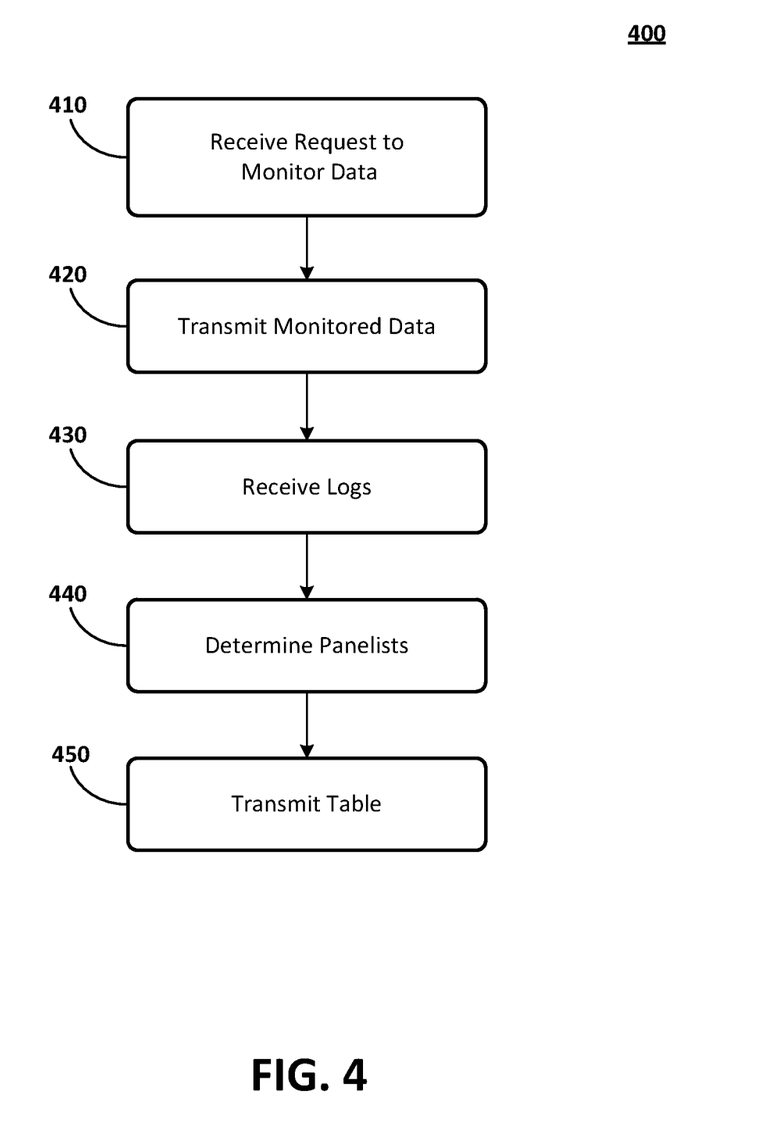
FIG. 4 illustrates an example of a method for sharing panelist information without providing cookies via a panel.

FIG. 4 illustrates an example of a method 400 for serving panelist information without cookie information via a panel 270. The method 400 may be implemented on a device, such as computer 100.

In operation 410, the panel 270 receives a request to monitor accesses to cookies for a predetermined time. The panel 270 may apply a bloom-filter, or any other process to ensure the anonymity of the monitored data.

In operation 420, the panel 270 transmits the monitored data to an online shared content network 260. The data is transmitted without any PII. The monitored data includes a collection of all the cookies accessed during the predetermined time.

In operation 430, the panel 270 may receive a log of actual accesses to the cookies from the online shared content network 260, with the actual accesses to the cookies being correlated with the cookies observed by the panel 270.

In operation 440, the panel 270 determines the panelists associated with the visitors indicated in the actual logs. Once the panel 270 determines the panelists associated with the actual logs, the panel 270 strips all cookie information associated with the panelists, while maintaining the access history associated with the visitor. Thus, a table is produced in operation 440 that indicates each panelist, with the panelist's activities associated with the cookies.

In operation 450, the table is transmitted to an external source, such as an online shared content network 260, or any implementer of system 200.

Certain of the devices shown in FIG. 1 include a computing system. The computing system includes a processor (CPU) and a system bus that couples various system components including a system memory such as read only memory (ROM) and random access memory (RAM), to the processor. Other system memory may be available for use as well. The computing system may include more than one processor or a group or cluster of computing system networked together to provide greater processing capability. The system bus may be any of several types of bus structures including a memory bus or memory controller, a peripheral bus, and a local bus using any of a variety of bus architectures. A basic input/output (BIOS) stored in the ROM or the like, may provide basic routines that help to transfer information between elements within the computing system, such as during start-up. The computing system further includes data stores, which maintain a database according to known database management systems. The data stores may be embodied in many forms, such as a hard disk drive, a magnetic disk drive, an optical disk drive, tape drive, or another type of computer readable media which can store data that are accessible by the processor, such as magnetic cassettes, flash memory cards, digital versatile disks, cartridges, random access memories (RAMs) and, read only memory (ROM). The data stores may be connected to the system bus by a drive interface. The data stores provide nonvolatile storage of computer readable instructions, data structures, program modules and other data for the computing system.

To enable human (and in some instances, machine) user interaction, the computing system may include an input device, such as a microphone for speech and audio, a touch sensitive screen for gesture or graphical input, keyboard, mouse, motion input, and so forth. An output device can include one or more of a number of output mechanisms. In some instances, multimodal systems enable a user to provide multiple types of input to communicate with the computing system. A communications interface generally enables the computing device system to communicate with one or more other computing devices using various communication and network protocols.

The preceding disclosure refers to a number of flow charts and accompanying descriptions to illustrate the embodiments represented in FIGS. 3 and 4. The disclosed devices, components, and systems contemplate using or implementing any suitable technique for performing the steps illustrated in these figures. Thus, FIGS. 3 and 4 are for illustration purposes only and the described or similar steps may be performed at any appropriate time, including concurrently, individually, or in combination. In addition, many of the steps in these flow charts may take place simultaneously and/or in different orders than as shown and described. Moreover, the disclosed systems may use processes and methods with additional, fewer, and/or different steps.

Embodiments disclosed herein can be implemented in digital electronic circuitry, or in computer software, firmware, or hardware, including the herein disclosed structures and their equivalents. Some embodiments can be implemented as one or more computer programs, i.e., one or more modules of computer program instructions, encoded on a tangible computer storage medium for execution by one or more processors. A computer storage medium can be, or can be included in, a computer-readable storage device, a computer-readable storage substrate, or a random or serial access memory. The computer storage medium can also be, or can be included in, one or more separate tangible components or media such as multiple CDs, disks, or other storage devices. The computer storage medium does not include a transitory signal.

As used herein, the term processor encompasses all kinds of apparatus, devices, and machines for processing data, including by way of example a programmable processor, a computer, a system on a chip, or multiple ones, or combinations, of the foregoing. The processor can include special purpose logic circuitry, e.g., an FPGA (field programmable gate array) or an ASIC (application-specific integrated circuit). The processor also can include, in addition to hardware, code that creates an execution environment for the computer program in question, e.g., code that constitutes processor firmware, a protocol stack, a database management system, an operating system, a cross-platform runtime environment, a virtual machine, or a combination of one or more of them.

A computer program (also known as a program, module, engine, software, software application, script, or code) can be written in any form of programming language, including compiled or interpreted languages, declarative or procedural languages, and the program can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

To provide for interaction with an individual, the herein disclosed embodiments can be implemented using an interactive display, such as a graphical user interface (GUI). Such GUI's may include interactive features such as pop-up or pull-down menus or lists, selection tabs, scannable features, and other features that can receive human inputs.

The computing system disclosed herein can include clients and servers. A client and server are generally remote from each other and typically interact through a communications network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

I claim:

1. A system for a panel information receiver sharing panelist information without providing cookie information, comprising:

a data store comprising a computer readable medium storing a program of instructions for the sharing of panelist information; and a processor configured to execute the program of instructions in order to:

receive, from a panel incorporated in a router with access to universal resource locators (URLs) accessed by panelists, where some hypertext transfer protocol (HTTP) requests associated with accessing the URLs contain embedded cookie identifiers (IDs), a log of the embedded cookie IDs;

receive an online shared content network log of information maintained by an online shared content network comprising cookie IDs transmitted with content from the shared content network as a result of requests for the content from the shared content network;

extract an intersecting subset of common cookie IDs from the online shared content network log with the log of embedded cookie IDs to create an extracted subset log comprising cookie IDs associated with panelists that have accessed content from the online shared content network;

transmit the extracted subset log to the panel; and receive data from the panel, the data comprising URLs from the HTTP requests associated with panelists that have accessed content from the online shared content network, the panelists identified using the extracted subset log comprising cookie IDs, the data excluding references to any of the embedded cookie IDs contained in the log of the embedded cookie IDs associated with the panelists.

2. The system according to claim 1, wherein the processor is configured to remove personal identification information (PII) included in the extracted subset log prior to transmitting.

3. The system according to claim 1, wherein the processor is configured to encrypt the extracted subset-log prior to transmitting.

4. The system according to claim 1, wherein the processor is configured to:

remove PII included in the extracted subset-log prior to transmitting; and encrypt the extracted subset-log subsequent to removing PII and prior to transmitting.

5. The system according to claim 1, wherein the received log of the embedded cookie IDs has undergone a bloom filtering by the panel.

6. The system according to claim 1, wherein the log of embedded cookie IDs is obtained from cookie data files.

7. The system according to claim 1, wherein the embedded cookie IDs of the log are associated with a specific time period.

8. The system according to claim 1, wherein the processor is configured to transmit a request to provide the log of the embedded cookie IDs.

9. The system according to claim 1, wherein the online shared content network log of information maintained by the online shared content network comprises all cookie IDs stored on the online shared content network transmitted with content from the shared content network.

10. A method for sharing panelist information without providing cookie information, comprising:

receiving, via a processor, from an embedded application installed in a web browser, information associated with a panelist of a panel comprising a cookie ID associated with the panelist;

receiving, via the processor, information from an online shared content network comprising cookie IDs transmitted with content from the shared content network as a result of requests for the content from the shared content network;

extracting, via the processor, an intersecting subset of common cookie IDs from the information associated with the panelist and the information from the online shared content network to create an extracted subset log, the extracted subset log comprising the cookie ID associated with the panelist that has accessed content from the online shared content network;

transmitting, via the processor, the extracted subset log to the panel; and receiving, via the processor, data from the panel, the data comprising URLs accessed by the panelist that has accessed content from the online shared content network, the panelist identified by the panel using the extracted subset log comprising cookie IDs, the data excluding the cookie ID associated with the panelist received via the processor from the embedded application installed in the web browser.

11. The method according to claim 10, further comprising removing personal identification information (PII) included in the extracted subset log prior to transmitting the extracted subset log to the panel.

12. The method according to claim 10, further comprising encrypting the extracted subset log prior to transmitting the extracted subset log to the panel.

13. The method according to claim 10, further comprising:

removing personal identification information (PII) included in the extracted subset log prior to transmitting the extracted subset log to the panel; and encrypting the extracted subset log prior to transmitting the extracted subset log to the panel.

14. The method according to claim 10, wherein the received information associated with the panelist of the panel has undergone a bloom filtering by the panel.

15. The method according to claim 10, wherein the information comprising the cookie ID associated with the panelist is in a form of a data file.

16. The method according to claim 10, wherein the information comprising the cookie ID associated with the panelist of the panel is extracted from cookie identifications integrated into universal resource link (URL) addresses.

17. The method according to claim 10, further comprising transmitting a request to provide the information associated with the panelist of the panel comprising the cookie ID associated with the panelist.

18. The method according to claim 10, wherein the information from the online shared content network comprises all cookie IDs stored on the online shared content network transmitted with content from the shared content network.

19. A method for sharing panelist information without providing cookie information from a panel, comprising:

receiving, via a processor, a request to monitor panelists for a predetermined time;

receiving, via the processor from respective embedded applications installed in respective mobile devices, information associated with each panelist of the panelists, the information comprising cookie IDs associated with the panelists for the predetermined time;

transmitting, via the processor, data comprising the cookie IDs associated with the panelist for the predetermined time;

receiving, via the processor, an extracted subset log comprising an intersecting subset of common cookie IDs from the data comprising the cookie IDs associated with the panelist with a record of cookie IDs transmitted with content from an online shared content network as a result of requests for the content from the shared content network for the predetermined time;

identifying, via the processor, the panelists having accessed content from the online shared content network based on the extracted subset log; and providing, via the processor, data comprising URLs accessed by the identified panelists, the data excluding references to any of the cookie IDs associated with the panelists received via the processor from the respective embedded applications installed in the respective mobile devices.

20. The method according to claim 19, wherein the record of cookie IDs transmitted with content from the online shared content network for the predetermined time comprises all cookie IDs transmitted with content from the online shared content network for the predetermined time.

\* \* \* \* \*